Nov. 20, 1923

L. RIENER ET AL

SAW SET

Filed Aug. 16, 1920

1,474,564

INVENTOR:
Lorenz Riener and
Frank Riener

BY C. W. Miles

ATTORNEY.

Patented Nov. 20, 1923.

1,474,564

UNITED STATES PATENT OFFICE.

LORENZ RIENER AND FRANK RIENER, OF DEER PARK, OHIO.

SAW SET.

Application filed August 16, 1920. Serial No. 403,931.

*To all whom it may concern:*

Be it known that we, LORENZ RIENER and FRANK RIENER, citizens of the United States, residing at Deer Park, in the county of Hamilton and State of Ohio, have invented certain new and useful Improvements in Saw Sets, of which the following is a specification.

Our invention relates to improvements in saw-sets. One of its objects is to provide an improved saw set applicable to a wide range of saw teeth of different size or pitch. Another object is to provide for setting two teeth at one operation. Another object is to provide for setting all of the teeth to a uniform degree. Another object is to provide for replacing the operative parts when worn, and to reverse them to secure a wider range of application. Another object is to so arrange the parts as to permit of a clear view of the saw at the point where it is being operated upon. Our invention also comprises certain details of form, combination, and arrangement, all of which will be fully set forth in the description of the accompanying drawings, in which:

Fig. 1, is a side elevation of our improved saw-set.

Fig. 2, is a plan view of the same.

Fig. 3, is an end view of the same.

Fig. 4, is an enlarged perspective view of one of the detachable operative jaws, detached.

Figs. 5, and 6 are sectional details on line 5—5 of Fig. 2.

The accompanying drawings illustrate the preferred embodiment of our invention in which 14 and 15 represent a pair of hand actuated levers or pliers pivotally connected together by a bolt 16. A spring 17 serves to normally hold the levers in an open position, and an adjustable thumb screw 18 threaded into a projection 19 on one of said levers acts as a stop to limit the relative movement of said levers. A lock nut 20 may be employed if desired to lock the screw 18 to its adjusted position.

At the opposite ends of said levers from their handles we provide windows 21 and 22 through which the saw may be observed at the joint where the tool is operating upon the saw, which is an important advantage in enabling the saw-set to be rapidly and accurately adjusted, and to observe the relative position of the setting teeth and saw teeth. The jaws or frames 23 and 24 surrounding said windows are recessed in staggered relation to receive and firmly support the bars 25 and 26 which are respectively armed on one or both edges with teeth 27 and 28 to engage the saw teeth from opposite sides of the saw and effect the setting thereof.

The bars 25 and 26 are preferably of tempered steel and by arranging the teeth 27 and 28 nearer to either one side or the other of said bars as indicated in Fig. 5, the bars may be reversed to increase or decrease the staggered relation of the teeth and thereby better adapt the saw set to operate on coarse saw-teeth or on fine saw-teeth. Ordinarily one pair of said reversible bars 25 and 26 will serve to set all grades of saw-teeth ordinarily encountered. However for very fine saw-teeth or extra coarse saw-teeth, special bars 25 and 26 are designed to be supplied and to be used interchangeably. Also those teeth which are least staggered when in use are also constructed sharper, or more narrow across their faces than those which are designed to be set further out of alignment. Indentations 29 are provided in opposite sides of the bars 25 and 26 into which the points of the set-screws 30 and 31 respectively enter to firmly lock the bars 25 and 26 to their positions, and also to insure said bars being adjusted always to the same position with reference to the levers 14 and 15, and to prevent their being set up carelessly in a wrong or inoperative relation to the levers 14 and 15. A saw gauge or guide 32 is detachably secured to the side of one of the frames, say 24, by means of a clamping bolt 33 passing through a slot 34 in the guide to enable the guide to be adjusted to different positions and to act as a guide or gauge for the saw teeth, and prevent the saw teeth entering too deeply between the jaws of the levers 14 and 15. Thus by adjusting the gauge 32 so that a longer or shorter section of the saw teeth come opposite the teeth 26 and 27, a saw may be set to a greater or less degree as required.

In practice a saw is preferably clamped in a saw vise and the saw set levers 14 and 15 held in a vertical position above the saw and in front of the operator so that the saw enters between the jaws or frames 23 and 24 and the gauge 32 rests upon the sharp edges of the saw teeth.

The operator can then see the bars 25 and 26 and the saw-teeth to be acted upon through one of the windows 21 and 22, and after adjusting the teeth of the bars 25 and 26 to register with two saw teeth, presses the lever handles together until the stop 18 arrests the movement. This results in a permanent bend or "set" of one saw-tooth toward the left hand and of the next adjacent saw tooth toward the right hand. The saw-set is next moved along the saw the distance of two saw teeth and the operation repeated until all of the saw teeth have been set, one half of them to the right hand and one half to the left hand. Where special types of saws having saw teeth in series of three or more teeth to a group are to be set, a special bar similar to bar 25 is provided from which one of its teeth, say one tooth 27, has been ground away, and this toothless bar employed with a bar, having a tooth 28 to set one tooth at a time to the right hand and the saw then reversed and the other series of saw teeth are set to the left hand. When the stop 18 is properly adjusted the jaws 23 and 24 when clamped to the limit come in contact with opposite faces of the saw at their extremities, and thereby avoid one tooth, say 27, acting excessively while the other tooth 28 does not act sufficiently, and thereby insures uniform setting of the teeth equally on each side of the saw. An adjustment of the gauge at the same time secures a mild or deep set of the teeth. The jaws 23 are respectively recessed at 36 and 37 to enable the saw teeth to pass across from one side to the other through or between the jaws.

The apparatus herein illustrated and described is capable of considerable modification without departing from the principle of our invention.

What we claim is:

1. A saw-set comprising a pair of jaws movable within prescribed limits to and from each other, a pair of bars detachably mounted relative to said jaws and each provided with an inclined saw setting tooth projecting outwardly from a plane face arranged in staggered relation to each other and arranged to engage adjacent teeth of a saw to set the saw teeth respectively in opposite directions.

2. A saw-set comprising a pair of jaws movable within prescribed limits to and from each other, a pair of bars detachably and reversibly mounted relative to said jaws and each provided with an inclined saw setting tooth projecting outwardly from a plane face at each side of said bars and arranged in staggered relation to adjustably engage adjacent teeth of a saw in pairs to set the saw teeth in opposite directions.

3. A saw-set comprising a pair of jaws movable within prescribed limits to and from each other, a pair of bars detachably mounted relative to said jaws and each provided with an inclined saw setting tooth projecting outwardly from a plane face arranged in staggered relation to engage adjacent teeth of a saw in pairs to set the saw teeth in opposite directions, and a saw gauge adjustable to limit the position of the saw teeth relative to said jaws.

In testimony whereof we have affixed our signatures.

LORENZ RIENER.
FRANK RIENER.